United States Patent
Pieger (10) Patent No.: US 11,305,356 B2
(45) Date of Patent: Apr. 19, 2022

(54) BUILDING CYLINDERS FOR MACHINES FOR THE LAYER-BY-LAYER PRODUCTION OF THREE-DIMENSIONAL OBJECTS

(71) Applicant: Trumpf Laser—und Systemtechnik GmbH, Ditzingen (DE)

(72) Inventor: Markus Pieger, Wendlingen am Neckar (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 54 days.

(21) Appl. No.: 16/824,243

(22) Filed: Mar. 19, 2020

(65) Prior Publication Data

US 2020/0215612 A1   Jul. 9, 2020

Related U.S. Application Data

(63) Continuation of application No. PCT/EP2018/074160, filed on Sep. 7, 2018.

(30) Foreign Application Priority Data

Sep. 20, 2017   (DE) .......................... 102017216625.8

(51) Int. Cl.
*B22F 12/00*   (2021.01)
*B33Y 10/00*   (2015.01)
(Continued)

(52) U.S. Cl.
CPC .............. *B22F 12/00* (2021.01); *B22F 10/10* (2021.01); *B33Y 10/00* (2014.12); *B33Y 30/00* (2014.12)

(58) Field of Classification Search
CPC .......... B22F 12/00; B22F 10/00; B33Y 10/00; B33Y 30/00
See application file for complete search history.

(56) References Cited

U.S. PATENT DOCUMENTS

| 2007/0023977 A1 | 2/2007 | Braun et al. |
| 2015/0202687 A1 | 7/2015 | Pialot et al. |

(Continued)

FOREIGN PATENT DOCUMENTS

| AU | 2009/272498 A1 | 1/2010 |
| CN | 205673594 U | 11/2016 |

(Continued)

OTHER PUBLICATIONS

DE Office Action in German Appln. No. 102017216625, dated May 9, 2018, 11 pages (with English translation).

(Continued)

*Primary Examiner* — Joseph S Del Sole
*Assistant Examiner* — Jamel M Nelson
(74) *Attorney, Agent, or Firm* — Fish & Richardson P.C.

(57) ABSTRACT

Building cylinders, for use in machines for the layer-by-layer production of 3D objects by sintering or melting powdered material by a high-energy beam, and having a main body and a piston part movable on an inner side of the main body along a cylindrical axis, are disclosed. The piston part has a base element for the growth of a 3D object, and a powder seal bearing against the inner side of the main body for sealing the powdered material. The piston part has a seal carrier on which the powder seal is mounted, and an insulator, e.g., a circumferential insulation ring, mounted on the seal carrier. The base element is mounted on the insulator and is arranged at a distance from the seal carrier and from the powder seal.

23 Claims, 8 Drawing Sheets

(51) Int. Cl.
*B33Y 30/00* (2015.01)
*B22F 10/10* (2021.01)

(56) References Cited

U.S. PATENT DOCUMENTS

| | | | |
|---|---|---|---|
| 2017/0130599 A1 | 5/2017 | Bunket et al. | |
| 2018/0079033 A1 | 3/2018 | Krueger et al. | |
| 2018/0133800 A1 | 5/2018 | Pieger et al. | |

FOREIGN PATENT DOCUMENTS

| | | | | |
|---|---|---|---|---|
| CN | 205851875 U | 1/2017 | | |
| CN | 106607589 A | 5/2017 | | |
| DE | 10342880 A1 * | 4/2005 | ........... | B29C 64/153 |
| DE | 10342880 A1 | 4/2005 | | |
| DE | 102015205314 A | 9/2016 | | |
| DE | 102015205314 A1 | 9/2016 | | |
| DE | 102015119698 A1 | 5/2017 | | |
| DE | 102016211214 A1 | 12/2017 | | |
| EP | 1839781 A2 | 10/2007 | | |
| EP | 2193863 A1 | 6/2010 | | |
| EP | 2905495 A1 | 8/2015 | | |
| WO | WO 2012126926 A1 | 9/2012 | | |
| WO | WO 2014/183934 A1 | 11/2014 | | |
| WO | WO 2016/207258 A1 | 12/2016 | | |
| WO | WO 2016/207258 A1 | 12/2016 | | |
| WO | WO-2016207258 A1 * | 12/2016 | ........... | B29C 64/214 |
| WO | WO 2017/102875 A1 | 6/2017 | | |
| WO | WO 2019/057523 A1 | 3/2019 | | |

OTHER PUBLICATIONS

PCT International Search Report and Written Opinion in International Appln. No. PCT/EP2018/074160, dated Nov. 26, 2018, 18 pages (with English translation).
CN Office Action in Chinese Appln. No. 201880061163.7, dated Dec. 1, 2021, 15 pages (with English translation).

* cited by examiner

BUILDING CYLINDERS FOR MACHINES FOR THE LAYER-BY-LAYER PRODUCTION OF THREE-DIMENSIONAL OBJECTS

CROSS REFERENCE TO RELATED APPLICATIONS

This application is a continuation of and claims priority under 35 U.S.C. § 120 from PCT Application No. PCT/EP2018/074160, filed on Sep. 7, 2018, which claims priority from German Application No. 10 2017 216 625.8, filed on Sep. 20, 2017. The entire contents of each of these priority applications are incorporated herein by reference.

TECHNICAL FIELD

The disclosure relates to building cylinders for machines for the layer-by-layer production of three-dimensional objects by sintering or melting powdered material using a high-energy beam.

BACKGROUND

Using layer-by-layer production of three-dimensional objects by sintering or melting by means of a high-energy beam, object shapes can be produced that are not accessible by conventional techniques (based for example on a casting process or on milling a solid body).

On a base element, generally a substrate (also known as a building platform) or a preform, in a building cylinder (also known as a building chamber), a thin layer of a powdered material is applied and then heated at selected locations by a high-energy beam until the powdered material melts or sinters. Subsequently, the base element is lowered by an associated piston part in the building cylinder by a layer thickness of the powder, a further layer of the powdered material is applied and again heated at selected locations by the high-energy beam, and so on. The powdered material is usually applied and heated while excluding air so as to prevent oxidation processes, in particular if a metal powdered material is being processed.

To prevent mechanical stresses in the finished object, the powdered material can be preheated before the high-energy beam takes effect. This preheating, along with the melting and sintering process, causes considerable heating at the building cylinder, for example at the base element, at the main body or even at the piston part.

As a result of this heating, temperature gradients may form at the building cylinder, and can lead to material warpage, for example at the main body, and thus reduce the manufacturing accuracy of the three-dimensional object.

The heating of the building cylinder additionally makes a rapid production sequence of objects on a 3D printing machine difficult. So as to produce objects on a 3D printing machine in a rapid sequence, the building cylinder along with the coated base element can, while still in a hot state, be replaced with a new building cylinder with a still uncoated base element; the further cooling of the hot building cylinder can then take place away from the 3D printing machine. However, the still hot building cylinder is difficult to handle. In particular, the main body should not warp, and preferably the object in the hot state should be protected from atmospheric oxygen.

WO 2016/207258 A1 discloses a building cylinder arrangement for a 3D printing machine in which, on an upper part of the piston, between the substrate and a clamping ring, a powder seal, for example of metal fiber material, is arranged. For the main body, on which the powder seal travels, a material having low thermal conductivity, such as quartz glass, is proposed on the inner side. A cooling device and a gas seal of elastomer material are provided on a lower part of the piston. Ceramic insulation components are provided between the upper part and lower part of the piston. The upper part of the piston is detachable from the remaining part of the piston so as to replace the main body and substrate on the machine. Below the clamping ring, a plurality of locking bars can be pivoted in and out together by way of a ring actuator.

The construction proposed therein makes it possible to handle even high substrate temperatures of 500° C. and more, but is very expensive and prone to breaking because of the quartz glass on the main body, in particular during handling for transport. Furthermore, comparatively high temperature gradients occur in the main body, and can promote temperature gradients in the interior of the building cylinder and can thus lead to production inaccuracies in the object. In addition, the high temperature gradients in the main body are maintained for a long time in the cooling phase; this promotes warpage of the produced object, for example when it is gripped by cold handling tools for transport in the hot state.

The post-published German patent application 10 2016 211 214.7 discloses a building cylinder arrangement in which a powder seal, formed as a circumferential fiber metal seal, is on a piston, which travels in a main body. A locking mechanism having radially extensible and retractable bars is provided on the main body. The bars can engage an upper part of the piston from below.

SUMMARY

The present disclosure provides building cylinders for 3D printing machines that achieve improved transportability, in particular robustness, and at the same time a high manufacturing accuracy of a three-dimensional object. The building cylinders described herein include a piston part with a seal carrier, on which a powder seal is mounted, a ceramic insulator, e.g., a circumferential insulation ring, mounted on the seal carrier, and a base element is mounted on the ceramic insulator, wherein the base element is arranged at a distance from the seal carrier and from the powder seal.

It is proposed to limit a heat input into the main body by arranging a ceramic insulator in the thermal conduction path between the powder seal and the base element (for example a substrate or substrate plate, or a preform), which is heated as a result of the layer-by-layer production of the three-dimensional object. As a result, the temperature of the powder seal can be kept low in comparison with the base element.

The powder seal is held by a seal carrier, which can absorb the mechanical forces acting on the powder seal; in particular, the insulator is not subjected to elastic forces on the powder seal. The insulator, e.g., insulation ring, is arranged between the seal carrier and the base element. The base element does not touch the seal carrier and the powder seal. The powder seal is thus arranged away from (kept remote from) the base element.

This arrangement provides that in operation, or in a cooling phase, a heat flow from the hot base element into the seal carrier and the powder seal and onward into the main body is reduced. Accordingly, all temperature gradients in the main body are reduced. Likewise, a low absolute, maximum, and average temperature of the main body can be achieved.

This reduces the risk of temporary or even permanent warpage (deformation) of the main body as a result of temperature gradients in the main body, which contributes to better manufacturing accuracy.

Handling during transport processes is also simplified by the low temperature gradients in the main body, and also by the overall low temperature of the main body due to the lower heat input via the powder seal. Any local changes in temperature, as a result of contacting with cold grippers, forks or the like, take a lesser effect in terms of deformations.

The components of the building cylinder can be tuned to one another in such a way that in operation the temperatures of the main body (at the powder seal) and powder seal are approximately equal and the thermal expansion coefficients (and preferably also their gradients) of the main body and powder seal are approximately equal (for example up to a temperature difference of 10° C. or less or up to a difference of 20% or less based on the lower thermal expansion coefficient). As a result, virtually constant sealing forces (which are virtually equal at every temperature) are achieved, and deformations in the base element are accordingly minimized, and this in turn improves the manufacturing accuracy of the three-dimensional object. The main body in the form of a cylindrical tube is furthermore formed with as few disruptions as possible to the shape thereof. In addition, between the base element and the main body, a powder rim can be left standing so as to improve the thermal insulation, and this likewise contributes to improved manufacturing accuracy; the powder rim is typically at least 2 mm wide.

The main body can readily be formed without quartz glass, and can be made of metal (for example steel). As a result, the main body can be formed as a robust tube construction; a risk of breaking can be prevented. Thermal conduction through the main body, for example to a gas seal of elastomer material in the region of a lower piston part, is less problematic, because as a result of the lower absolute temperature of the main body in the region of the powder seal, a lower temperature is also established at the gas seal or other relevant points in the main body.

The powder seal is typically formed of metal fibers compacted together. These can achieve better oxidation resistance than, for example, graphite seals; in addition, the thermal expansion behavior of metal fiber seals can easily be adjusted and tuned to the material of the main body. The seal carrier is typically produced from metal, such as steel. The insulator is typically formed as a circumferential insulation ring; however, a multi-part insulator is also possible. The insulator can, for example, be produced from $Al_2O_3$ or other insulation ceramics.

The base element is typically radially set back with respect to the inner wall of the main body, for example by 1.5 mm or more; in general, the piston part only touches the main body by way of the powder seal. The gap between the base element and the main body is typically filled up with powdered material during the building process so as to insulate the melting zone. The powdered material is usually a metal powder, but can also be a ceramic powder or a plastics material powder; an average particle size (D50) is typically between 25 μm and 100 μm. The process temperature (preheating temperature of the powdered material) in the main body is typically 400° C.-500° C., or even more than 500° C. The main body itself is typically not actively cooled; however, active cooling of the building cylinder is generally provided from below via a lower piston part.

Embodiments Relating to the Insulator

In some embodiments, the seal carrier has a lower seal carrier ring and an upper seal carrier ring, which are mounted on top of one another and together form an external guide, in particular an external circumferential groove, in which the powder seal is laid. The powder seal is typically clamped between the lower seal carrier ring and the upper seal carrier ring, in such a way that the powder seal is elastically and/or plastically deformed by the two seal carrier rings that are mounted together. The two-part formation makes it possible to remove an edge of the groove in the divided state, in such a way that the powder seal then does not have to be pulled over the (removed) edge during assembly, which could damage the powder seal.

In some embodiments, the lower seal carrier ring and the upper seal carrier ring are fixed to one another by screws or by a bayonet mechanism. These fastening mechanisms are easy to open even after a large number of heating cycles, for example for maintenance of the powder seal.

In some embodiments, the insulator is formed as a circumferential insulation ring. The insulation ring is simple to mount, and (by contrast with a multi-part formation) prevents joints or gaps through which the powdered material could penetrate into the interior of the piston part or piston. Through the opening of the ring, it is possible to act on the base element from below, for example with a heater, in particular an infrared heater, a contact heater, or an inductive heater.

In some embodiments, a mutual contact profile of the base element and the insulator has a sub-portion extending counter to gravity, e.g., a sub-portion extending vertically upward, in the progression from outside to inside, and a mutual contact profile of the seal carrier and the insulator also has a sub-portion extending counter to gravity, e.g., a sub-portion extending vertically upward, in the progression from outside to inside. The specified contact profiles, discernible for example in the longitudinal section along the cylinder axis, make it difficult for powdered material to penetrate into the interior of the piston part or piston. The terms "upward" and "downward" as used herein are based on the orientation in a normal building process. It should be noted that the mutual contact profile can also have portions on surfaces that are spaced apart from one another and opposite one another.

Embodiments with a Carrier Ring

In some embodiments, a circumferential carrier ring is arranged on the outside of the main body of the building cylinder, in which, distributed on the internal circumference, a plurality of radially outwardly directed recesses for bearing bolts are formed. In certain embodiments, in the main body, distributed on the external circumference of the main body, a plurality of radially inwardly directed depressions for bearing bolts are formed. In some embodiments, a plurality of bearing bolts are provided, each bearing bolt penetrating into a recess and into a depression opposite the recess. In certain embodiment, an internal diameter of the carrier ring is greater than an external diameter of the main body. In certain embodiments, each bearing bolt is mounted in the recess and depression thereof with play in the longitudinal direction.

The circumferential carrier ring makes it possible to engage the building cylinder (e.g., from below) irrespective of the rotational position thereof with respect to the cylinder axis. The carrier ring is mounted "floating" on the main body. As a result of the (sufficiently large) difference in diameter between the carrier ring and main body and the (sufficiently large) play of the bearing bolts, it is possible to prevent the carrier ring from being tensioned with respect to the main body, as a result of (different) thermal deformations, and corresponding mechanical deformations from being introduced to the main body. This prevents the piston part from "stalling" when travelling past the carrier ring; this makes the 3D printing more precise. The main body can thus expand unobstructed, and in the same manner as the powder seal, in the region of the carrier ring. The carrier ring is typically arranged approximately axially centrally on the main body. Typically, at least three bearing bolts, e.g., five or six bearing bolts, are provided.

In a further development of this embodiment, a length L of each bearing bolt is greater than the sum of the depth TV of the associated depression and the depth TA of the associated recess. As a result of the (sufficiently large) length of the bearing bolt, such that L>TV+TA, it can be ensured that the carrier ring does not touch the main body in any position, even in the event of high temperatures in the main body. As a result, the heat dissipation from the main body into the carrier ring is restricted to the (slight) heat paths through the bearing bolts, and temperature gradients in the main body in the region of the bearing ring are minimized. The depressions in the main body represent merely a slight disruption to the main body structure, and so likewise only slight temperature gradients are produced as a result. When the piston part travels past during the building process, deformations due to temperature gradients are then likewise minimized, and stalling is prevented. It should be noted that TV and TA should be tuned to the play of the bearing bolt in the longitudinal direction in such a way that the bolts cannot fall out, not even in the event of high temperatures in the base element.

In some embodiments, the carrier ring is formed with an upper carrier ring part and a lower carrier ring part, which are mounted on top of one another and together form the recesses. As a result of the two-part configuration of the carrier ring, it can be opened (divided) for simple mounting of the bearing bolts; after the bearing bolts are inserted into the partially formed recesses in a carrier ring part and the depressions in the main body, the other carrier ring part can be mounted.

The lower carrier ring part and the upper carrier ring part can be fixed to one another by screws. In other cases, a bayonet mechanism can also be used to fix the carrier ring parts to one another. These fastening variants have proven themselves in practice, and can still be opened easily after many heating cycles.

Embodiments for the Control Ring

In some embodiments, a control ring, e.g., a disk-shaped control ring, is mounted rotatably about the cylinder axis on the main body, e.g., on the lower end of the main body. In certain embodiments, the control ring has external teeth. In some embodiments, on the control ring, distributed in the circumferential direction, a plurality of control curve recesses are formed, wherein the control curve recesses change the radial position thereof as they progress in the circumferential direction. In certain embodiments, on the main body, in particular on the lower end of the main body, distributed in the circumferential direction, a plurality of support bolts are mounted radially displaceably. In some embodiments, the support bolts each have an axially projecting tappet, which engages in a control curve recess of the control ring.

In certain embodiments, by rotating the control ring, the support bolts can be displaced between a radially inwardly extended position, in which the piston part can lie on the support bolts, and a retracted position, in which the piston part can pass the support bolts. With this variant, it is possible for the piston part, on which the base element (for example a substrate plate) and the seal carrier are formed, to be engaged from below so as to replace the building cylinder along with the base element.

The proposed support bolt mechanism is particularly robust in terms of the functionality thereof, even in the presence of the amounts of powdered material that are usual in the process. By the control ring, all support bolts can be actuated simultaneously, making particularly rapid and reliable handling possible. By way of the external teeth, mechanical coupling to a motorized drive is possible in a simple manner. The external teeth is typically formed fully circumferential so as to be independent of a rotational orientation. Typically, at least three support bolts, e.g., four, five or six, are provided.

A further development of this embodiment is advantageous in which at least one spring element is provided, by which the control ring is biased into a rotational position in which the support bolts are in the radially inwardly extended position. As a result, during transport of the building cylinder outside the 3D printing machine, it is ensured that the piston part remains engaged from below.

Embodiments for the Cover

In some embodiments, the building cylinder has a cover for sealing the building cylinder at an upper side with a circumferential seal, e.g., sealing film, which is arranged between a cover-side support portion and a main-body-side support portion when the cover is placed on the building cylinder. The cover-side support portion, e.g., the curvature thereof, and the main-body-side support portion, e.g., the curvature thereof, are formed in such a way that when the cover is placed on, there is a substantially linear force input into the seal. By the seal, which tunes itself to irregularities in the contact portions, and by the linear force input, which can bring about large local contact forces merely by way of force of gravity of the cover, particularly good sealing against gas, in particular atmospheric oxygen, can be achieved.

A further development of this embodiment is advantageous in which, in the longitudinal section along the cylinder axis, the radius of curvature of the cover-side support portion and the radius of curvature of the main-body-side support portion have a different sign and differ in magnitude in the region of the linear force input, in particular in which the cover-side support portion is formed with convex curvature with a larger magnitude of the radius of curvature and the main-body-side support portion is formed with concave curvature and a smaller magnitude of the radius of curvature. As a result of the different curvature, linear force input can be achieved in a simple manner. By the curved surfaces, a sharp edge that will be poorly sealed can additionally be prevented. The linear force input is present over the entire circumference.

In some embodiments, the seal, e.g., sealing film, is fastened laterally on the cover, e.g., in which the cover, at least in the radial edge region, is formed with an upper cover part and a lower cover part that are mounted on top of one another and between which a part of the seal, e.g., sealing film, is clamped. The lateral arrangement has proven itself in practice, and is particularly easily accessible and requires only a little sealing material. The clamping fastening is stable even at high temperatures, and makes simple replacement of the seal or sealing film possible when required (e.g., after wear). The cover parts are typically screwed together.

In some embodiments, the seal, e.g., sealing film, is or comprises pure graphite. The pure graphite can be easily plastically deformed by the linear force input, and then forms particularly good sealing. In addition, graphite is particularly oxidation-resistant in air at medium temperatures.

In some embodiments, at the upper end facing the cover, the main body forms a contour that narrows radially in the axially inward direction, and/or, at the lower face facing the main body, the cover has a contour that tapers radially in the axially outward direction. As a result, the cover can be guided into the correct, sealing position when placed on.

General Embodiments

In some embodiments, the side walls of the main body, which guide the piston part, are produced from metal, e.g., steel such as fine-grained steel, at least on the inner side or in their entirety. This makes the main body particularly cost-effective and robust, in particular in comparison with embodiments including quartz glass. The metal, which is generally highly thermally conductive, additionally reduces temperature gradients in the main body.

The scope of the present disclosure also includes a machine for layer-by-layer production of three-dimensional objects by sintering or melting powdered material by a high-energy beam (e.g., a laser beam), including
- a process chamber, including a powder cylinder connector for a powder cylinder, a building cylinder connector for a building cylinder, and a slider for applying a layer of the powdered material in the building cylinder,
- at least one powder cylinder for the powdered material, including a base that is movable in the powder cylinder,
- at least one building cylinder as described herein,
- a high-energy beam source, such as a machining laser,
- a scanner for the high-energy beam, such as scanner optics,
- a first lifting device (e.g., a hydraulic or electro-motor device) for the powder piston of a powder cylinder mounted on the powder cylinder connector;
- a second lifting device (e.g., a hydraulic or electro-motor device) for the piston part of a building cylinder mounted on the building cylinder connector.

Three-dimensional objects can be manufactured on the machine (3D printing machine) with high manufacturing accuracy, and the building cylinder can be transported in a simplified manner. The machine is suitable for producing three-dimensional objects at temperatures of approximately 400° C.-500° C., or even higher, of the powdered material to be melted or sintered.

In some embodiments, the second lifting device can include
- an intermediate piston part, the intermediate piston part being lockable and releasable on the piston part by a locking device, and including a heating device for the base element of a locked piston part,
- a lower piston part including a cooling element, a gas seal, in particular of elastomer material, being on the lower piston part, and
- a thermal insulation element, such as a ceramic insulation plate, arranged between the intermediate piston part and the lower piston part, and the intermediate part being displaceable, for the building process, together with the locked piston part and the lower piston part in the main body of a building cylinder connected to the building cylinder connector. By this construction, good gas sealing of the building cylinder can be ensured during the building process, and at the same time a high powder temperature can be set. If appropriate, the lower piston part can also be formed without an active cooling element.

The scope of the present disclosure also includes systems that include a machine as described herein, a plurality of building cylinders as described herein, and furthermore at least one floor conveyor, by which a building cylinder can be brought to the machine, e.g., to the building cylinder connector, and/or away from the machine, e.g., away from the building cylinder connector. For example, the floor conveyor can have a fork for engaging a carrier ring of a building cylinder from below, and in particular the floor conveyor device having a gripper by which a cover of the building cylinder can be held down.

The new system scan produce three-dimensional objects layer-by-layer in rapid succession in the building cylinders. By the floor conveyor (e.g., floor conveyance vehicle), the building cylinders can be brought from the machine to a temporary store so as to cool down there without the machine being blocked. On the machine, further three-dimensional objects can be produced layer-by-layer by the further building cylinders. By the gripper, unintended opening of the cover, for example as a result of acceleration forces when the floor conveyor accelerates, can be prevented.

Further advantages of the new methods and systems can be derived from the description and drawings. Likewise, the aforementioned features and those set out hereinafter can be used each individually or in a plurality in any desired combinations.

The shown and described embodiments are not to be understood as a definitive enumeration, but rather are of an exemplary nature for describing the invention.

DETAILED DESCRIPTION

Overview

Figure 1:
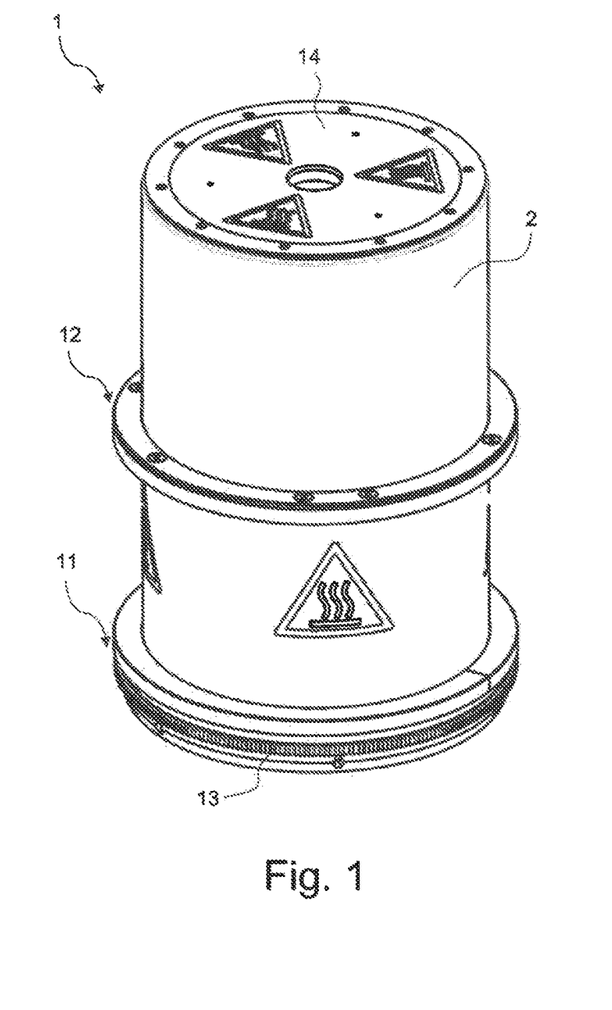
FIG. 1 is a schematic oblique view of an embodiment of a building cylinder as described herein.
Figure 2:
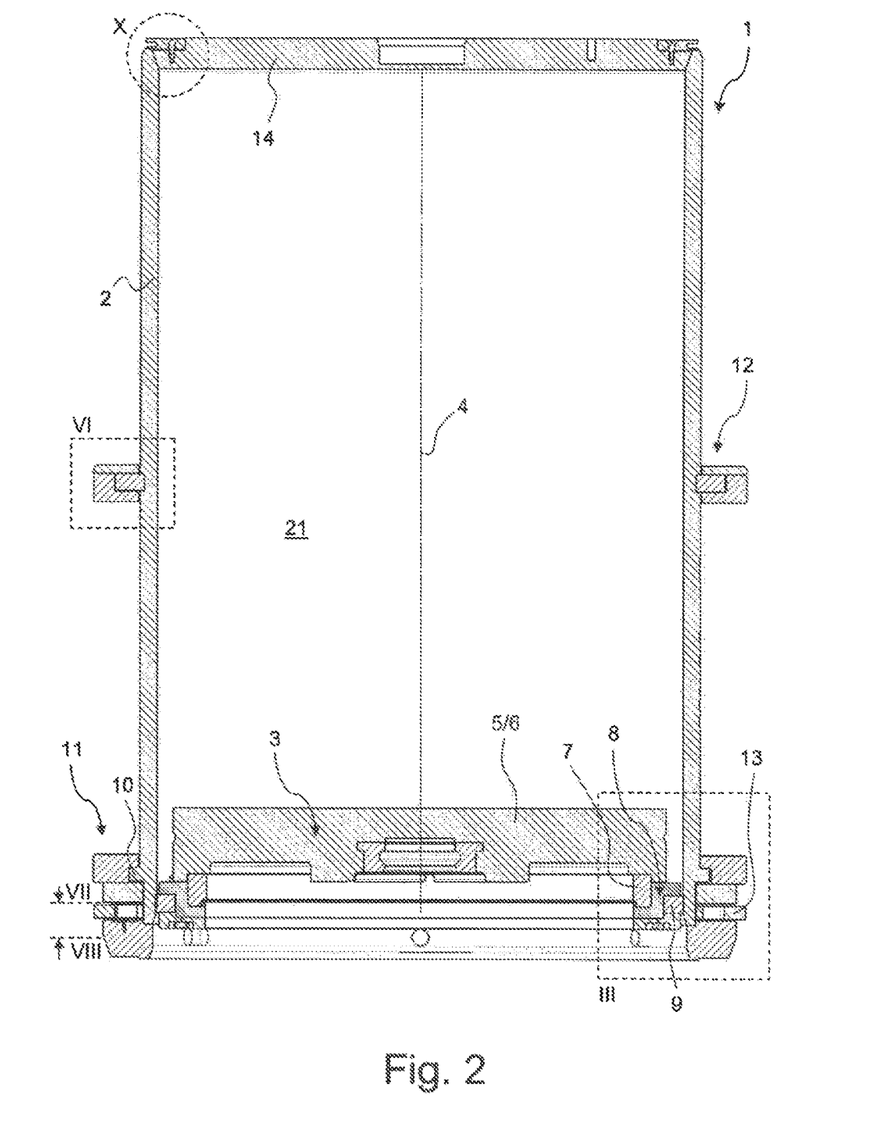
FIG. 2 is a schematic longitudinal section through the building cylinder of FIG. 1.

FIG. 1 and FIG. 2 are a perspective view and a longitudinal section of an embodiment of a building cylinder 1 as described herein. The building cylinder 1 has a substantially cylindrical main body 2 of (in this case) fine-grained steel, in which a piston part 3 (also referred to as an upper piston part) is displaceable along a cylinder axis 4. The piston part 3 has a base element 5, in this case a substrate 6, on which one or more three-dimensional objects can be grown layer by layer. The space 21 above the base element 5 is gradually filled with the three-dimensional object or objects and the powdered material; it should be noted that the building process starts in a moved-upward position of the piston part 3, and the piston part 3 is lowered incrementally in the main body 2 during the building process.

The base element 5 is positioned on an insulator device, e.g., a ceramic insulator device 7, which in turn is braced on a seal carrier 8, which in this case is in two parts. The insulator device 7 is annular and in one piece. In the seal carrier 8 a powder seal 9 is held that bears against the inner side of the main body 2 (more on this at FIGS. 3 and 4).

The main body 2 is smooth internally and substantially also externally, and with the exception of a clamping band 10 of a support bolt mechanism 11 has no circumferential shoulders or bands. The material of the main body 2 is typically highly thermally conductive, for example having a thermal conductivity (at room temperature) of at least 20 W/(m*K) or of at least 40 W/(m*K); usually, the main body 2 is produced from steel.

Figure 5:
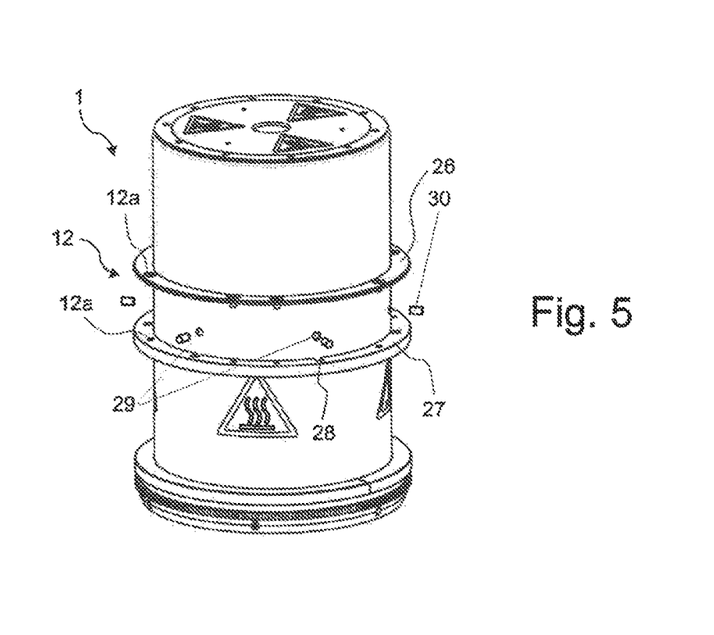
FIG. 5 is a schematic view of the building cylinder of FIG. 1, with the carrier ring in an exploded view.
Figure 6:
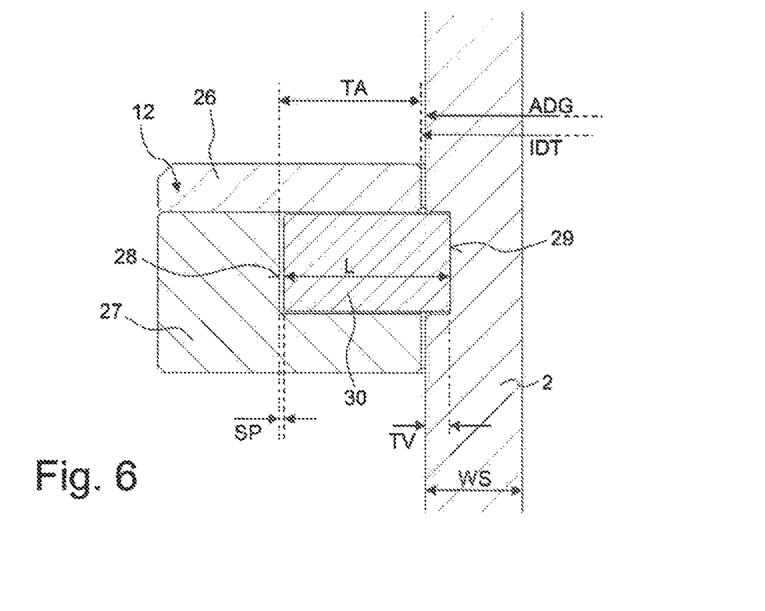
FIG. 6 is an enlarged detail from FIG. 2 in the region of the carrier ring; see box VI.

Approximately axially centrally is a carrier ring 12, which is mounted floatingly on the main body 2 (more on this at FIGS. 5 and 6).

The piston part 3 can be supported by the support bolt mechanism 11, which is on the underneath of the main body 2, in such a way that the piston part 3 cannot fall downward out of the main body 2. The support bolt mechanism 11 has an externally toothed, in this case disc-shaped, control ring 13 (more on this at FIGS. 7, 8, and 9).

Figure 11:
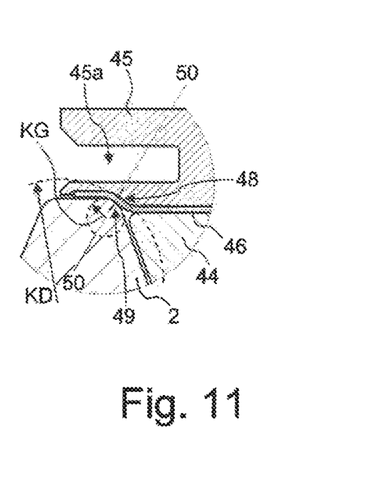
FIG. 11 is an enlarged detail of FIG. 10 in the region of the support portions; see circle XI.
Figure 12:
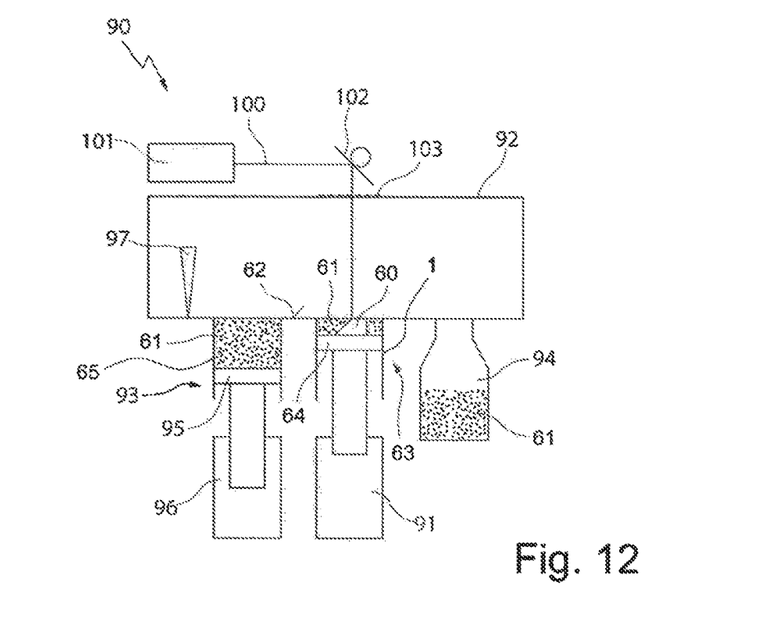
FIG. 12 is a schematic view of an embodiment of a machine as described herein for layer-by-layer production of three-dimensional objects.

The upper side of the main body 2 is sealed by a cover 14 (more on this at FIGS. 11 and 12).

The Insulator

Figure 3:
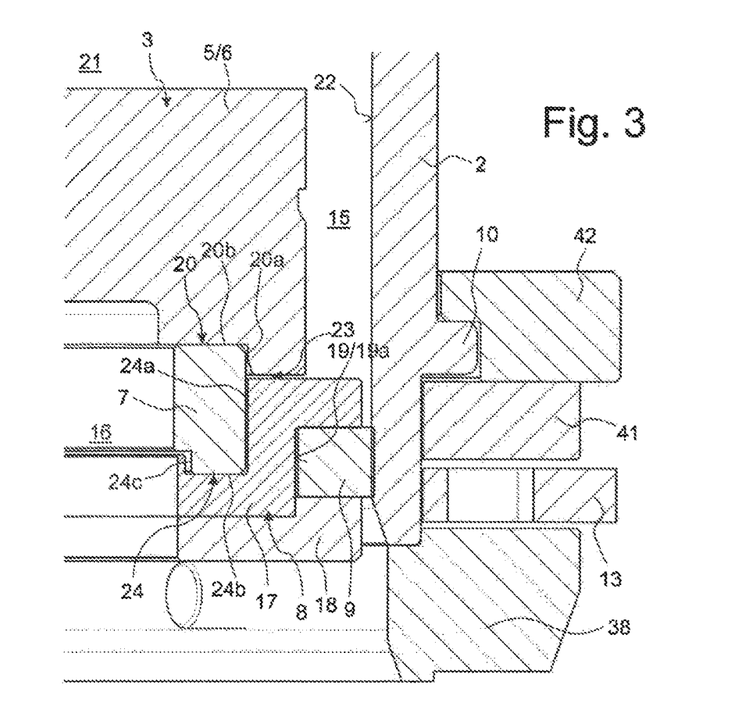
FIG. 3 is an enlarged detail of FIG. 2 in the region of an insulator; see box III.

FIG. 3 illustrates the region around the insulator device 7 in greater detail in a longitudinal section. The insulator device 7 can be made of ceramic, e.g., $Al_2O_3$, and carries the base element 5/substrate 6. A mutual contact profile 20 includes (considered from radially outside to inside) a sub-portion 20a extending counter to gravity, in this case vertically upward, and a horizontally extending sub-portion 20b. The sub-portion 20a makes it difficult for powdered material from the gap 15 between the main body 2 and the substrate 6 to enter the piston interior 16.

The insulator device 7 is in turn positioned on the seal carrier 8. The seal carrier 8 is in two parts, with an upper seal carrier ring 17 and a lower seal carrier ring 18, which are mounted on one another and axially fixed together. Together, they form an external guide 19, specifically a groove 19a, in which the powder seal 9 is arranged. The powder seal 9 protrudes radially with respect to the seal carrier 8. The powder seal 9 is a fiber metal seal, which is clamped between the seal carrier rings 17, 18 in the axial direction. The powder seal 9 additionally bears against the inner side 22 of the main body 2 under radial elastic tension.

The substrate 6 is spaced apart from the upper side of the upper seal carrier ring 17 by a small gap 23. A mutual contact profile 24 of the insulator device 7 and the upper seal carrier ring 17 includes (considered from radially outside to inside) a vertically downwardly extending sub-portion 24a, a horizontally extending sub-portion 24b, and a sub-portion 24c extending counter to gravity (vertically upward). The sub-portion 24c in turn makes it difficult for powdered material from the gap 15 between the main body 2 and the substrate 6 to enter the piston interior 16.

Figure 4:
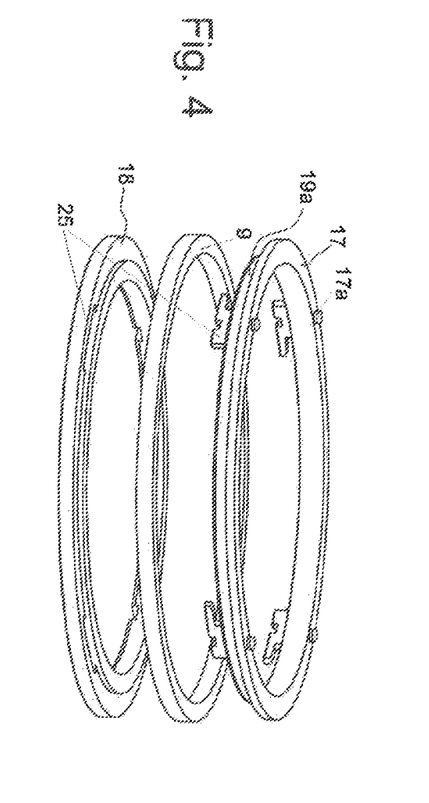
FIG. 4 is a schematic exploded view of a variant of a seal carrier as described herein.

FIG. 4 illustrates a possible assembly of a two-part seal carrier and a powder seal 9. The powder seal 9 is initially arranged on the lower seal carrier ring 18 without tension. Subsequently, the upper seal carrier ring 17 is placed on and fixed (in this case torqued) using a bayonet mechanism 25. Although the powder seal 9 engages radially inward into the resulting groove 19a, no elastic spreading of the powder seal 9 is required for the mounting.

The powder seal 9 lets no powder material, or at most small amounts, through between the piston part 3 and the main body 2 in the axial direction (e.g., in such a way that the support bolt mechanism is not impaired). In addition, the powder seal 9 poses an obstacle to the penetration of atmospheric oxygen into the space 21 during transport of the building cylinder (see FIG. 3). Centering pins 17a, for corresponding indents on an insulator that is to be placed on, are additionally on the upper seal carrier ring 17.

The Carrier Ring

FIG. 5 is an exploded view of the carrier ring 12. The carrier ring 12 is in two parts, with an upper carrier ring part 26 and a lower carrier ring part 27. In the mounted state, a plurality of recesses 28 are formed by the carrier ring parts 26, 27, and extend radially outward from a radial inner side of the carrier ring 12 and are arranged distributed in the circumferential direction. Further, a plurality of depressions 29 are formed radially inward on the main body 2, distributed in the circumferential direction.

For mounting the carrier ring 12, bearing bolts 30 are initially introduced into the depressions 29, and then the lower carrier ring part 27 is brought up to the bearing bolts 30 from below. The bearing bolts reach in part into the recesses 28, and subsequently the upper carrier ring part 26 is displaced onto the lower carrier ring part 27 from above and fastened, e.g., screwed via screw holes 12a.

As is indicated in FIG. 6, the internal diameter IDT of the carrier ring 12 is greater than the external diameter ADG of the main body 2. Further, the sum of the radial depth TV of a depression 29 and the radial depth TA of a recess 28 is greater than the length L of a bearing bolt 30 in the radial direction. A bearing bolt 30 has a non-vanishing radial play SP between the main body 2 and the carrier ring 12. This play should be present for temperatures ranging from room temperature (approximately 20° C.) to an operating temperature (typically approximately 400-500° C.) in the main body 2 when the three-dimensional objects are being produced. This ensures that the carrier ring 2 does not touch the main body 2 and thermal conduction into the carrier ring 2 is minimized. In addition, no mechanical tension can be transmitted from the carrier ring 12 to the main body 2 and deform the body.

The bearing bolts 30 can be made of a poorly thermally conductive material, such as high-alloy austenitic steel or a ceramic, having a thermal conductivity of less than 20 W/(m*K), e.g., less than 3 W/(m*K). The depth TA of the recesses 28 is typically much less than the wall thickness WS of the main body 2, with TV≤0.33*WS, e.g., TV≤0.25*WS.

The Support Bolts

Figure 7:
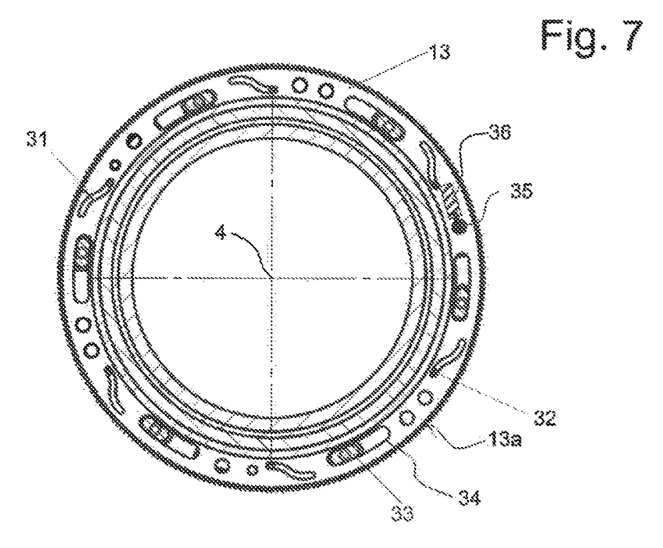
FIG. 7 is a cross-sectional view through the building cylinder of FIG. 2, slightly above the control ring; see plane VII.

FIG. 7 shows a control ring 13 for the support bolt mechanism. The control ring 13 is mounted rotatably about the cylinder axis 4 and has an external teeth 13a, via which coupling to a motorized, typically automatically controlled drive takes place. The drive can take place via a mechanical coupling transmission having curve gear reduction and a pneumatic linear actuator.

Control curve recesses 31, in each of which an axially overhanging tappet 32 of a support bolt engages, are on the control ring 13. The control curve recesses 31 each extend, progressing in the circumferential direction from the right end (as seen from the inside), from radially further inward to a left end positioned radially further outward. Therefore, when the control ring 13 rotates clockwise in FIG. 7, the tappets 32 are moved radially outward. Conversely, the tappets 32 can then be moved radially inward again by moving the control ring 13 counterclockwise.

The control ring 13 is further penetrated at guide recesses 34 by guide elements 33, which ensure that the control ring 13 is rotatable. Further, a first coupling bolt 35 is fastened to the control ring 13, and is linked to a spring element 36, e.g., a tension spring.

Figure 8:
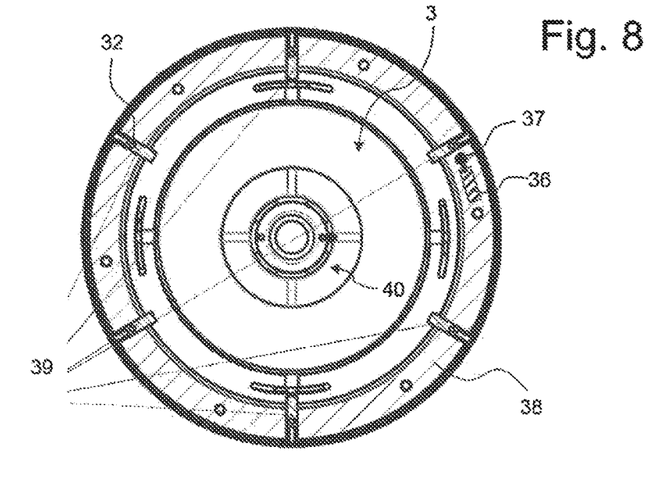
FIG. 8 is a cross-sectional view through the building cylinder of FIG. 2 at the level of the support bolts; see plane VIII.

FIG. 8 illustrates a lower bearing ring 38 of the support bolt mechanism. In the lower bearing ring 38, the support bolts 39 are mounted linearly displaceably in the radial direction. In the lower bearing ring 38, a second coupling bolt 37 is further formed, to which the spring element 36 is likewise linked. The tensile force of the spring element 36 tensions the control ring into the rotational position shown in FIG. 7, in which the tappets 32 of the support bolts 39 are slid radially inward, and accordingly the support bolts 39 are displaced radially inward as shown in FIG. 8. The spring element 36 is in an intermediate space (not shown in greater detail).

By rotating the control ring, the radially guided support bolts 39 can be radially extended and retracted by way of the tappets 32.

Part of a locking device (coupling mechanism) 40 for linking the piston part 3 to an intermediate piston part is also discernible in FIG. 8. Also see FIG. 13.

Figure 9:
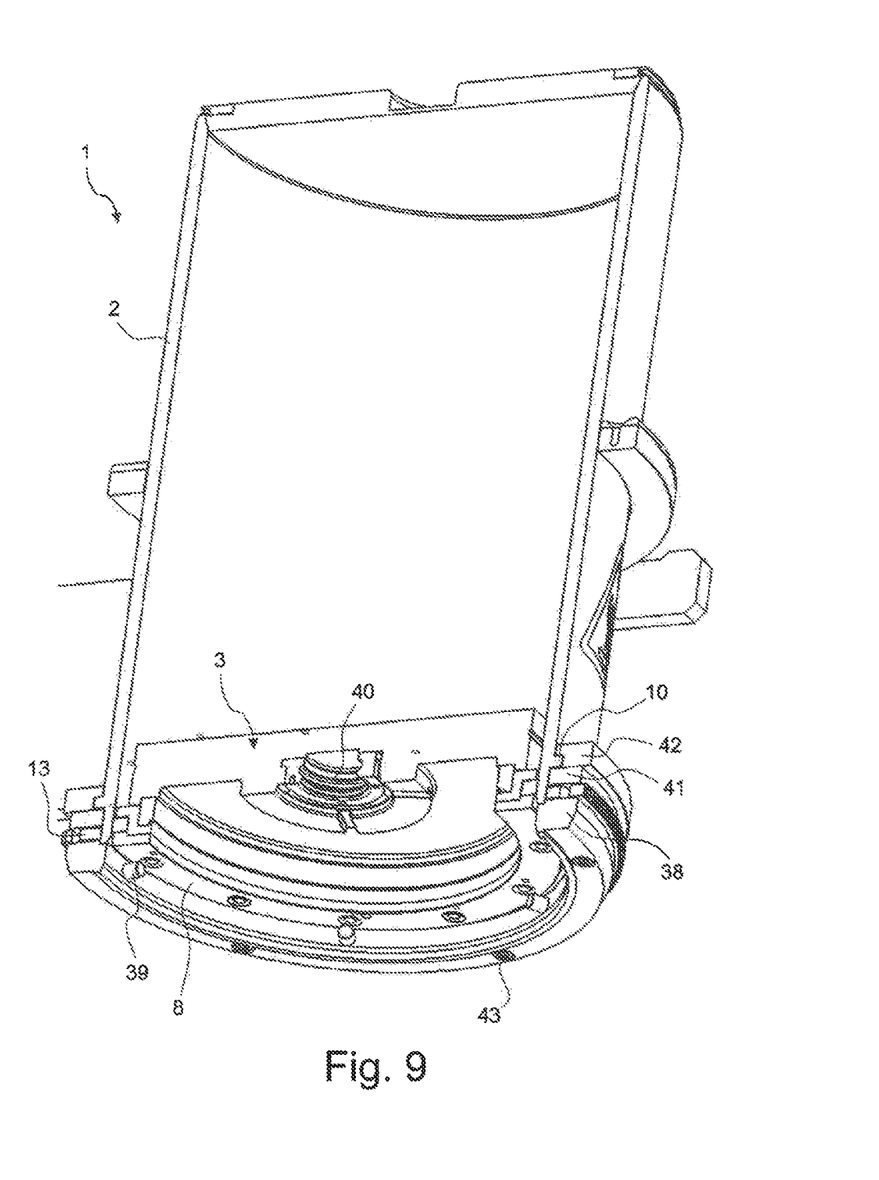
FIG. 9 is a schematic, sectional oblique view through the building cylinder of FIG. 2, with inwardly extended support bolts.

The radially inwardly extended support bolts 39 are also discernible in the view of the building cylinder 1 of FIG. 9. The piston part 3 is positioned on the support bolts 39 by way of the lower side of the seal carrier 8.

The lower bearing ring 38 is connected via screws 43, which extend into the guide elements, to a central bearing ring 41 and an upper bearing ring 42, the clamping band 10 of the main body 2 being clamped between the central bearing ring 41 and the upper bearing ring 42.

The Cover

Figure 10:
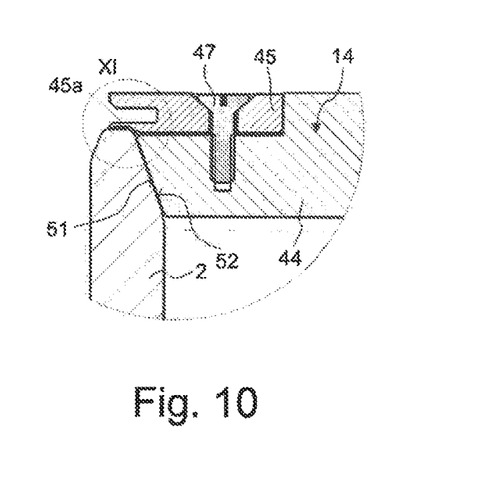
FIG. 10 is an enlarged detail of FIG. 2 in the region of the edge of a cover; see circle X.

FIG. 10, and, in an enlarged detail, FIG. 11, show the edge of the main body 2 in the region of the upper side thereof, which is sealed by the cover 14 for transport (for example from a 3D printing machine to a cooling store); it should be noted that during machining the upper side remains open to ensure access of a high-energy beam to the base element or to an object already partially produced thereon (see FIG. 12).

The cover 14 is in this example formed in two parts, with a lower cover part 44, which extends over the entire width of the cover 14, and an upper cover part 45, which extends in a radial edge region. A sealing film 46 is clamped between the upper cover part 45 and the lower cover part 44; the cover parts 44, 45 are mounted on top of one another by screws 47. The sealing film 46 protrudes radially with respect to the lower cover part 44 (laterally outwards), but not with respect to the upper cover part 45.

When the cover 14 is placed on (closed), the sealing film 46 bears against a cover-side, curved support portion 48 and a main-body-side, curved support portion 49. The radius of curvature KD (illustrated by a dashed circle sector) of the concave cover-side support portion 48 is much greater in magnitude than the radius of curvature KG (illustrated by a dashed full circle) of the convex main-body-side support portion 49. As a result, simply the force of gravity of the cover 14 results in a substantially linear force input 50 into the sealing film 46, which provides locally particularly high forces for plastic deformation of the sealing film 46.

The sealing film 46, e.g., consisting of pure graphite, nestles exactly against the support portions 48, 49 and the irregularities or roughness thereof as a result of the plastic deformation, and thus achieves a particularly good sealing effect over the entire circumference. After one-time use (one-time replacement of the building cylinder, sealed with the cover 14 in a cooling phase, on a 3D printing machine), the sealing film 46 is typically replaced.

The main body 2 forms, for example, at the upper-side end, an axially inwardly radially narrowing contour (flat chamfer) 51. The cover 14 or the lower cover part 44 forms on the lower face thereof an equal but opposite, axially outwardly (downwardly) radially tapered contour (flat chamfer) 52. As a result, when the cover 14 is placed on the main body 2, mutual guidance and centering can take place.

The cover 14 is typically produced from steel; it can additionally be protected from corrosion by a galvanic layer of chromium or with a chemical nickel layer. The upper cover part 45, for example, can have a circumferential notch 45a to facilitate the handling of the cover 14.

3D Printing Machine

FIG. 12 is a schematic side view of an embodiment of a machine 90 as described herein for layer-by-layer production of a three-dimensional object 60 (or a plurality of three-dimensional objects), also known as a 3D printing machine. The machine 90 includes a gas-tight process chamber 92, which can be filled and/or rinsed, in a manner not shown in greater detail, with an inert gas (protective gas), for example nitrogen or a noble gas such as argon.

A powder cylinder arrangement 93 including a powder cylinder (reserve cylinder) 65 for a powdered material 61 (shown dotted), from which the three-dimensional object 60 is produced by sintering or melting, is connected to the process chamber 92. The powdered material 61 can for example consist of metal particles having an average particle size (D50) of 25-100 µm. By incrementally raising a powder piston 95 by a first lifting device (e.g., a powder hoisting device) 96, a small amount of the powdered material 61 is raised above the level of the base 62 of the process chamber 92, in such a way that, by a motor-actuatable slider 97, this small amount can be brought to a building cylinder arrangement 63 including a building cylinder 1 as described herein (for example as shown in FIG. 1).

The building cylinder arrangement 63, likewise connected to the process chamber 92, has the piston 64, on the upper side of which (on the substrate, not shown in greater detail) the three-dimensional object 60 is constructed. Before each new layer of the three-dimensional object 60 is produced, the piston 64 is lowered by one step by a second lifting device (e.g., a hoisting device) 91, and a small amount of the powdered material 61 is swept into the building cylinder arrangement 63 by the slider 97.

Subsequently, the newly applied powder layer is locally illuminated, and thus locally strongly heated, from above by a high-energy beam 100, in the shown variant a machining laser beam (e.g., from a local machining laser 101 and penetrating through a window 103 into the process chamber 92), at points that are intended for locally solidifying (melting on, sintering on) the powdered material 61. The machining laser beam is guided (scanned) over the substrate by a scanning device 102 such as scanner optics (containing one or more mirrors which are pivotable in total about at least two axes).

Subsequently, further layers are produced until the three-dimensional object 60 is finished. Excess powdered material 61 can be swept into a collection container 94 by the slider 97.

Figure 13:
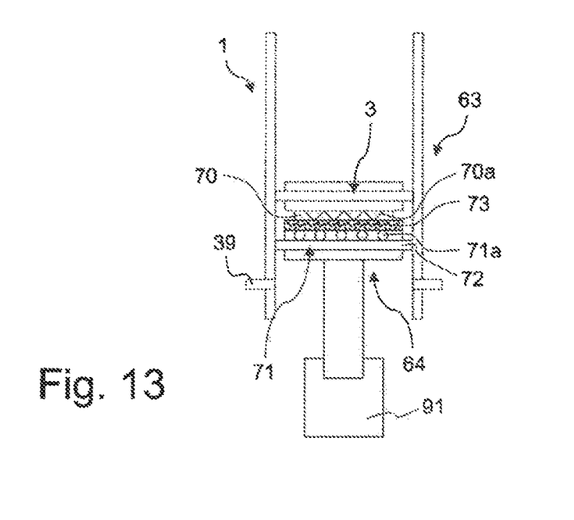
FIG. 13 is a schematic side view of an intermediate piston part and a lower piston part for a machine as described herein.

FIG. 13 illustrates the region of the piston 64 of the building cylinder arrangement 63 in greater detail. The piston 64 includes the piston part 3 of the building cylinder 1, and further a piston intermediate part 70 including a heater 70a, a thermal insulation element (e.g., an insulation plate, e.g., a ceramic insulation plate) 73, and a lower piston part 71, including an active cooling element 71a (it should be noted that in a variant the cooling element can also be omitted) and a gas seal 72 of elastomer material. Between the piston part 3 and the intermediate piston part 70, the piston 64 can be connected by a locking device (not shown in greater detail, but cf. FIG. 8, FIG. 9) and separated, depending on the progress of the method. The intermediate piston part 70 can additionally be oriented (tilted about two axes) with respect to the lower piston part 71, in a manner not shown in greater detail.

The intermediate piston part 70 and the lower piston part 71 always remain on the second lifting device 91 (shown solid in FIG. 13) or on the 3D printing machine, and the piston part 3 remains in the building cylinder 1 thereof (shown dotted in FIG. 13) during production and transport.

For displacing the base element or piston part 3 during the layer-by-layer production of the three-dimensional object, the piston 64 is connected. For replacing the building cylinder 1 on the 3D printing machine, the piston 64 is separated, the intermediate piston part 70 and the lower piston part 71 being moved downward out of the building cylinder 1; the intermediate piston part 70 and the lower piston part 71 can pass the (radially outwardly) retracted support bolts 39. With the piston 64 separated, the piston part 3 is held by way of the support bolts 39, which are then (radially inwardly) extended (see FIG. 9).

Figure 14:
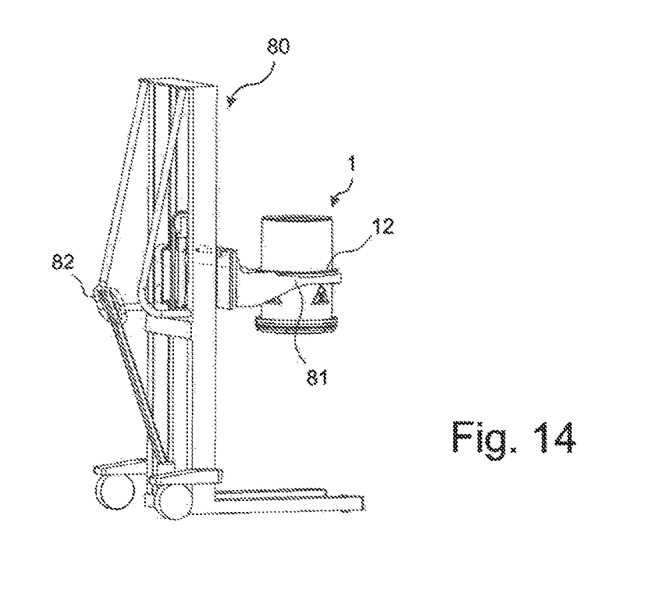
FIG. 14 is a schematic perspective view of a floor conveyor for a system as described herein.

FIG. 14 shows a floor conveyor 80, e.g., a manual, self-propelled, or automated floor conveyance vehicle including handles 82, by which a building cylinder 1 on a 3D printing machine can be replaced and transported, as described herein. The floor conveyor 80 has a fork 81, by which the carrier ring 12 on the building cylinder 1 can be engaged from below. The fork 12 is height-adjustable.

Other Embodiments

A number of embodiments of the invention have been described. Nevertheless, it will be understood that various modifications may be made without departing from the spirit and scope of the invention. Accordingly, other embodiments are within the scope of the following claims.

LIST OF REFERENCE NUMERALS

1 Building cylinder
2 Main body
3 Piston part (upper piston part)
4 Cylinder axis
5 Base element
6 Substrate
7 Insulation device, e.g., an insulation ring
8 Seal carrier
9 Powder seal; in this case: metal fiber seal
10 Clamping band
11 Support bolt mechanism
12 Carrier ring
12a Screw holes
13 Control ring
13a External teeth
14 Cover
15 Gap (between substrate and main body)
16 Piston interior
17 Upper seal carrier ring
18 Lower seal carrier ring
19 Guide
19a Groove
20 Mutual contact profile (substrate/insulation device)
20a Sub-portion extending counter to gravity
20b Horizontal sub-portion
21 Space
22 Inner side
23 Gap
24 Mutual contact profile (seal carrier/insulation device)
24a Vertical sub-portion
24b Horizontal sub-portion
24c Sub-portion extending counter to gravity
25 Bayonet mechanism
26 Upper carrier ring part
27 Lower carrier ring part
28 Recess
29 Depression
30 Bearing bolt
31 Control curve recess
32 Tappet
33 Guide element
34 Guide recess
35 First coupling bolt
36 Spring element
37 Second coupling bolt
38 Lower bearing ring
39 Support bolt
40 Locking device
41 Central bearing ring
42 Upper bearing ring
43 Screw
44 Lower cover part
45 Upper cover part
46 Sealing film
47 Screw
48 Cover-side support portion
49 Main-body-side support portion
50 Linear force input
51 Narrowing contour on the main body
52 Tapering contour on the cover
60 Three-dimensional object
61 Powdered material
62 Base
63 Building cylinder arrangement
64 Piston
65 Powder cylinder
70 Intermediate piston part
70a Heater
71 Lower piston part
71a Cooling device
72 Gas seal 73 Thermal insulation element, e.g., a ceramic thermal insulation plate
80 Floor conveyor
81 Fork
82 Handle
90 Machine (3D printing machine)
91 Second lifting device
92 Process chamber
93 Powder cylinder arrangement
94 Collection container
95 Powder piston
96 First lifting device
97 Slider
100 High-energy beam; in this case: laser beam
101 Machining laser
102 Scanning device
103 Window
ADG External diameter of the main body
IDT Internal diameter of the carrier ring
KD Radius of curvature of the cover-side support portion
KG Radius of curvature of the main-body-side support portion
L Length of the bearing bolt
SP Radial play
TA Depth of the recess
TV Depth of the depression

What is claimed is:

1. A building cylinder arrangement for a machine for the layer-by-layer production of three-dimensional objects by sintering or melting powdered material by a high-energy beam, comprising:
   a) a building cylinder with a main body substantially in the form of a cylindrical casing and with an upper piston part movable on an inner side of the main body along a cylinder axis,
   wherein the upper piston part comprises, on its upper side, a base element in the form of a substrate or a preform, for the growth of a three-dimensional object,
   and further comprises a powder seal bearing against the inner side of the main body for sealing the powdered material;
   b) an intermediate piston part comprising a heater;
   c) a thermal insulation element, and
   d) a lower piston part comprising a gas seal,
   wherein the upper piston part, the intermediate piston part, the thermal insulation element, and the lower piston part together form a piston of the building cylinder arrangement, which piston is displaceable in the main body and can be connected and separated between the upper piston part and the intermediate piston part by a locking element,
   wherein the upper piston part has a seal carrier, on which the powder seal is mounted,
   wherein an insulation device is mounted on the seal carrier, and
   wherein the base element is mounted on the insulation device and is located at a distance from the seal carrier and from the powder seal.

2. The building cylinder arrangement of claim 1, wherein the thermal insulation element comprises a ceramic insulation plate.

3. The building cylinder arrangement of claim 1, wherein the insulation device comprises a circumferential insulation ring.

4. The building cylinder arrangement of claim 1, wherein the gas seal comprises an elastomer material.

5. The building cylinder arrangement of claim 1, wherein the seal carrier has a lower seal carrier ring and an upper seal carrier ring, which are mounted on top of one another and together form an external guide in which the powder seal is laid.

6. The building cylinder arrangement of claim 5, wherein the external guide comprises an external circumferential groove.

7. The building cylinder arrangement of claim 1, wherein a mutual contact profile of the base element and the thermal insulator has a sub-portion extending counter to gravity in the progression from outside to inside, and wherein a mutual contact profile of the seal carrier and the insulator also has a sub-portion extending counter to gravity in the progression from outside to inside.

8. The building cylinder arrangement of claim 1, wherein
   on the outside of the main body a circumferential carrier ring is arranged in which, distributed on the internal circumference, a plurality of radially outwardly directed recesses for bearing bolts are formed,
   in the main body, distributed on the external circumference of the main body, a plurality of radially inwardly directed depressions for bearing bolts are formed,
   a plurality of bearing bolts are provided, each bearing bolt penetrating into a recess and into a depression opposite the recess, and
   an internal diameter of the carrier ring is greater than an external diameter of the main body, and each bearing bolt is mounted in the recess and depression thereof with play in the longitudinal direction.

9. The building cylinder arrangement of claim 5, wherein a length L of each bearing bolt is greater than the sum of a depth TV of the associated depression and a depth TA of the associated recess.

10. The building cylinder arrangement of claim 5, wherein the carrier ring is formed with an upper carrier ring part and a lower carrier ring part, which are mounted on top of one another and together form the recesses.

11. The building cylinder arrangement of claim 1, wherein
   a control ring is mounted rotatably about the cylinder axis on the lower end of the main body,
   the control ring has external teeth,
   on the control ring, distributed in the circumferential direction, a plurality of control curve recesses are formed, wherein the radial position of the control curve recesses change as they progress in the circumferential direction,
   a plurality of support bolts are mounted radially displaceably on the lower end of the main body, distributed in the circumferential direction,
   the support bolts each have an axially projecting tappet that engages a control curve recess of the control ring, and
   by rotating the control ring, the support bolts can be displaced between a radially inwardly extended position, in which the upper piston part can lie on the support bolts, and a retracted position, in which the upper piston part can pass the support bolts.

12. The building cylinder arrangement of claim 11, wherein at least one spring is provided, by which the control ring is biased into a rotational position in which the support bolts are in the radially inwardly extended position.

13. The building cylinder arrangement of claim 1, wherein
   the building cylinder has a cover for sealing the building cylinder at an upper side, a circumferential seal is arranged between a cover-side support portion and a main-body-side support portion when the cover is placed on, and the cover-side support portion and the main-body-side support portion are formed such that when the cover is placed on there is a substantially linear force input into the seal.

14. The building cylinder arrangement of claim 13, wherein in the longitudinal section along the cylinder axis, a radius of curvature (KD) of the cover-side support portion and a radius of curvature (KG) of the main-body-side support portion have a different sign and differ in magnitude in a region of the linear force input, and wherein the cover-side support portion is formed with a convex curvature with a larger magnitude of the radius of curvature (KD) and the main-body-side support portion is formed with a concave curvature with a smaller magnitude of the radius of curvature (KG).

15. The building cylinder arrangement of claim 13, wherein the seal is fastened laterally on the cover, and wherein the cover, at least in a radial edge region, is formed with an upper cover part and a lower cover part that are mounted on top of one another and between which a part of the seal is clamped.

16. The building cylinder arrangement of claim 13, wherein the circumferential seal comprises a sealing film.

17. The building cylinder arrangement of claim 16, wherein the sealing film comprises graphite.

18. The building cylinder arrangement of claim 13, wherein at the upper end facing the cover, the main body forms a contour that narrows radially in the axially inward direction, and/or at the lower face facing the main body, the cover has a contour that tapers radially in the axially outward direction.

19. The building cylinder arrangement of claim 1, wherein the lower piston part is formed with an active cooling element.

20. The building cylinder arrangement of claim 1, wherein the thermal insulation element is arranged between the intermediate piston part and the lower piston part.

21. A machine for layer-by-layer production of three-dimensional objects by sintering or melting powdered material by a high-energy beam, comprising:

a process chamber comprising a powder cylinder connector for a powder cylinder, a building cylinder connector for a building cylinder, and a slider for applying a layer of the powdered material in the building cylinder;

at least one powder cylinder for the powdered material, comprising a powder piston that is movable in the powder cylinder;

at least one building cylinder arrangement of claim 1;

a high-energy beam source;

a scanner for the high-energy beam;

a first lifting device for the powder piston of a powder cylinder mounted on the powder cylinder connector; and a second lifting device for the upper piston part of a building cylinder mounted on the building cylinder connector.

22. The machine of claim 21, wherein in the second lifting device, the intermediate piston part comprises the heater for the base element of a locked upper piston part, the lower piston part comprises a cooling element, the thermal insulation element is arranged between the intermediate piston part and the lower piston part, and the intermediate part is displaceable, for the building process, together with the locked upper piston part and the lower piston part in the main body of a building cylinder connected to the building cylinder connector.

23. A system comprising a machine of claim 21;

a plurality of building cylinders; and at least one floor conveyor, by which a building cylinder can be brought to or away from the machine;

wherein the floor conveyor comprises a fork for engaging a carrier ring of a building cylinder from below, and wherein the floor conveyor comprises a gripper by which a cover of the building cylinder can be held down.

* * * * *